(12) United States Patent
Kanazawa

(10) Patent No.: US 9,118,046 B2
(45) Date of Patent: Aug. 25, 2015

(54) HUMIDIFIER AND FUEL CELL SYSTEM

(75) Inventor: Hirofumi Kanazawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 861 days.

(21) Appl. No.: 12/600,698

(22) PCT Filed: May 22, 2008

(86) PCT No.: PCT/JP2008/059850
§ 371 (c)(1),
(2), (4) Date: Nov. 18, 2009

(87) PCT Pub. No.: WO2008/149753
PCT Pub. Date: Dec. 11, 2008

(65) Prior Publication Data
US 2010/0151337 A1    Jun. 17, 2010

(30) Foreign Application Priority Data

Jun. 7, 2007    (JP) .................................. 2007-151304

(51) Int. Cl.
*H01M 8/06* (2006.01)
*B01D 63/02* (2006.01)
*H01M 8/04* (2006.01)
*F24F 3/14* (2006.01)
*H01M 8/10* (2006.01)

(52) U.S. Cl.
CPC ...... *H01M 8/04126* (2013.01); *H01M 8/04141* (2013.01); *H01M 8/04149* (2013.01); *F24F 2003/1435* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 2001/0009306 A1* | 7/2001 | Shimanuki et al. ........... 261/104 |
| 2001/0021467 A1* | 9/2001 | Suzuki et al. .................... 429/12 |
| 2005/0110172 A1 | 5/2005 | Tanaka et al. |
| 2005/0116365 A1* | 6/2005 | Yazawa ......................... 261/104 |
| 2007/0084591 A1* | 4/2007 | Siverklev ...................... 165/165 |
| 2008/0217795 A1* | 9/2008 | Gofer et al. ................... 261/104 |

FOREIGN PATENT DOCUMENTS

| JP | 2000-030725 A | 1/2000 |
| JP | 2001-334131 A | 12/2001 |
| JP | 2004-162878 A | 6/2004 |

(Continued)

OTHER PUBLICATIONS

Extended European Search Report of EP 08 76 4819 issued Dec. 12, 2011.

*Primary Examiner* — Krishnan S Menon
(74) *Attorney, Agent, or Firm* — Kenyon & Kenyon LLP

(57) ABSTRACT

This specification discloses a humidifier that attains the inhibition of the damaging of a steam permeable membrane at low temperatures, and a fuel cell system. The humidifier has a steam permeable membrane therein. In the humidifier, an oxidizing gas and an oxidizing off gas with a humidity higher than that of the oxidizing gas are introduced, and the oxidizing gas is humidified by the oxidizing off gas via the steam permeable membrane. The steam permeable membrane is located at a position lower than an inlet for the oxidizing gas but higher than an outlet therefor. Further, the steam permeable membrane is located at a position lower than an inlet for the oxidizing off gas but higher than an outlet therefor.

14 Claims, 4 Drawing Sheets

(56) References Cited

FOREIGN PATENT DOCUMENTS

| JP | 2004-207022 A | 7/2004 |
|----|---------------|--------|
| JP | 2005-044665 A | 2/2005 |
| JP | 2005-155994 A | 6/2005 |
| JP | 2005-158429 A | 6/2005 |
| JP | 2006-253041 A | 9/2006 |
| JP | 2006-318750 A | 11/2006 |
| JP | 2006-338984 A | 12/2006 |
| JP | 2007-046801 A | 2/2007 |
| JP | 2007-093192 A | 4/2007 |
| JP | 2007-218539 A | 8/2007 |
| JP | 2008-288036 A | 11/2008 |
| WO | 2007/017722 A1 | 2/2007 |

* cited by examiner

HUMIDIFIER AND FUEL CELL SYSTEM

This is a 371 national phase application of PCT/JP2008/059850 filed 22 May 2008, which claims priority to Japanese Patent Application No. 2007-151304 filed 07 Jun. 2007, the contents of which are incorporated herein by reference.

TECHNICAL FIELD

The present invention relates to a humidifier and a fuel cell system. In particular, it relates to a humidifier which is effective for the improvement of a countermeasure against freezing in the winter, a cold district or the like.

BACKGROUND ART

A fuel cell system includes a fuel cell which generates a power by an electrochemical reaction between a fuel gas and an oxidizing gas. In a solid polymer type fuel cell, in order to increase the efficiency of the power generation thereof, an electrolyte film needs to be held in a humid state. This humid state is usually held by a humidifier which humidifies the fuel gas or the oxidizing gas.

In a conventional humidifier, an internal humidifying system which performs water exchange between a highly humid oxidizing off gas and a lowly humid oxidizing gas is frequently employed. The oxidizing off gas is more humid than the oxidizing gas, because the oxidizing off gas discharged from an air electrode of the fuel cell contains water generated by the electrochemical reaction.

JP 2005-44665 A discloses a humidifier of the internal humidifying system which includes a hollow fiber membrane having steam permeability in a case thereof. In this humidifier, the upper part of the case is provided with an inlet and an outlet for the oxidizing gas, and both the side parts of the case are provided with an inlet and an outlet for the oxidizing off gas. In addition, the oxidizing off gas and the oxidizing gas are introduced into the case, and the respective gases flow outside and inside the hollow fiber membrane. In consequence, a water is absorbed from the highly humid oxidizing off gas by the hollow fiber membrane, and the water passes through the membrane by a capillary phenomenon to move to the lowly humid oxidizing gas, whereby the oxidizing gas is replenished with the water.

DISCLOSURE OF THE INVENTION

Meanwhile, a fuel cell system is used in the low-temperature environment of the winter, a cold district or the like sometimes. However, JP 2005-44665 A does not disclose any countermeasure against freezing in the humidifier. In consequence, the following problems might occur.

Specifically, during the halt of the fuel cell system in the low-temperature environment, if water remains in the oxidizing off gas inlet of the humidifier, the water condenses into ice. Then, during the next startup of the fuel cell system, the ice might be flied by an introduced oxidizing off gas to come in contact with the hollow fiber membrane, and might damage the hollow fiber membrane. Moreover, the ice formed in the bottom of the case might damage the hollow fiber membrane by the flow of an oxidizing gas.

Accordingly, an object of the present invention is to provide a humidifier capable of inhibiting a steam permeable membrane from being damaged at low temperatures, and a fuel cell system.

To achieve the above object, the humidifier of the present invention is provided therein with a steam permeable membrane, and introduces thereinto a first gas and a second gas having a humidity higher than that of the first gas to humidify the first gas by the second gas via the steam permeable membrane. The humidifier comprises inlets and outlets for the first gas and the second gas, respectively, the inlets and outlets being communicated with the inside thereof. Moreover, the humidifier satisfies at least one of the following (a) and (b), and preferably satisfies both of them:

(a) the inlet for the first gas is located at a position higher than the outlet for the first gas; and (b) the inlet for the second gas is located at a position higher than the outlet for the second gas.

Moreover, to achieve the above object, a fuel cell system of the present invention comprises a fuel cell which generates a power by an electrochemical reaction between an oxidizing gas and a fuel gas, wherein by use of the humidifier of the present invention, at least one of the oxidizing gas and the fuel gas to be fed to the fuel cell is humidified.

According to the present invention, a portion where water included in the first gas and/or the second gas condenses and accumulates, and a portion where the water condenses into ice at a low temperature (e.g., at 0° C.) are not positioned on a high inlet side but are positioned on a low outlet side, and can further be positioned on the downstream side of the first gas and/or the second gas. In consequence, even when the first gas and/or the second gas flows from the high inlet to the low outlet, the ice and the water are inhibited from being directed to the steam permeable membrane due to the flow. Therefore, the steam permeable membrane can be inhibited from being damaged. Moreover, as to the fuel cell system to which the humidifier of the present invention is applied, the low-temperature startup properties thereof can be improved.

According to one preferable configuration, the position of the steam permeable membrane may be lower than the inlet for the first gas but higher than the outlet for the first gas. Moreover, according to one preferable configuration, the position of the steam permeable membrane may be lower than the inlet for the second gas but higher than the outlet for the second gas.

According to this constitution, even when the water condenses in the steam permeable membrane, the water moves to an outlet side owing to gravity. In consequence, the water can be inhibited from being accumulated in the steam permeable membrane, and the steam permeable membrane can be inhibited from being frozen.

According to one preferable configuration, at least a part of the inlet for the first gas may be higher than the upper limit position of the steam permeable membrane, and at least a part of the outlet for the first gas may be lower than the lower limit position of the steam permeable membrane. Moreover, at least a part of the inlet for the second gas may be higher than the upper limit position of the steam permeable membrane, and at least a part of the outlet for the second gas may be lower than the lower limit position of the steam permeable membrane.

Also according to such a constitution, the water can be inhibited from being accumulated in the steam permeable membrane, and the steam permeable membrane can be inhibited from being frozen.

Here, as the steam permeable membrane, either a flat membrane or a hollow fiber membrane may be employed. According to one preferable configuration, the steam permeable membrane may be the hollow fiber membrane, the first gas may flow outside the hollow fiber membrane, and the second gas may flow through the hollow fiber membrane.

According to one preferable configuration, the humidifier may be connected to a pipe through which the first gas or the second gas flows to communicate with the inside of the humidifier. The pipe may be provided with a valve having a valve body located at a position higher than that of the humidifier in a gravity direction.

According to this constitution, the water which has condensed in the humidifier can be inhibited from being accumulated in the valve body. In consequence, the operation defect of the valve body due to the freezing can be inhibited from being generated.

According to one preferable configuration, the humidifier may comprise a case which is provided with the inlets and the outlets for the first gas and the second gas, respectively, and in which the steam permeable membrane is disposed.

Another humidifier of the present invention for achieving the above object has a case into and from which a first gas and a second gas having a humidity higher than that of the first gas are introduced and discharged, and a steam permeable membrane provided in the case, and the humidifier humidifies the first gas by the second gas via the steam permeable membrane. Moreover, the case is configured so that at least one of the first gas and the second gas in the case flows from a higher position to a lower position in a gravity direction.

Also according to this constitution, the water condenses or the condensed water becomes ice at a portion in the lower position of the case, and the portion can be located on the downstream side of the first gas and/or the second gas. In consequence, even when the first gas and/or the second gas flows from the higher position to the lower position, the condensed water or the ice can be inhibited from being directed to the steam permeable membrane by the flow. Therefore, the steam permeable membrane can be inhibited from being damaged.

BEST MODE FOR CARRYING OUT THE INVENTION

Hereinafter, there will be described an example in which a humidifier according to a preferable embodiment of the present invention is applied to a fuel cell system, with reference to the accompanying drawing.

First Embodiment

Figure 1:
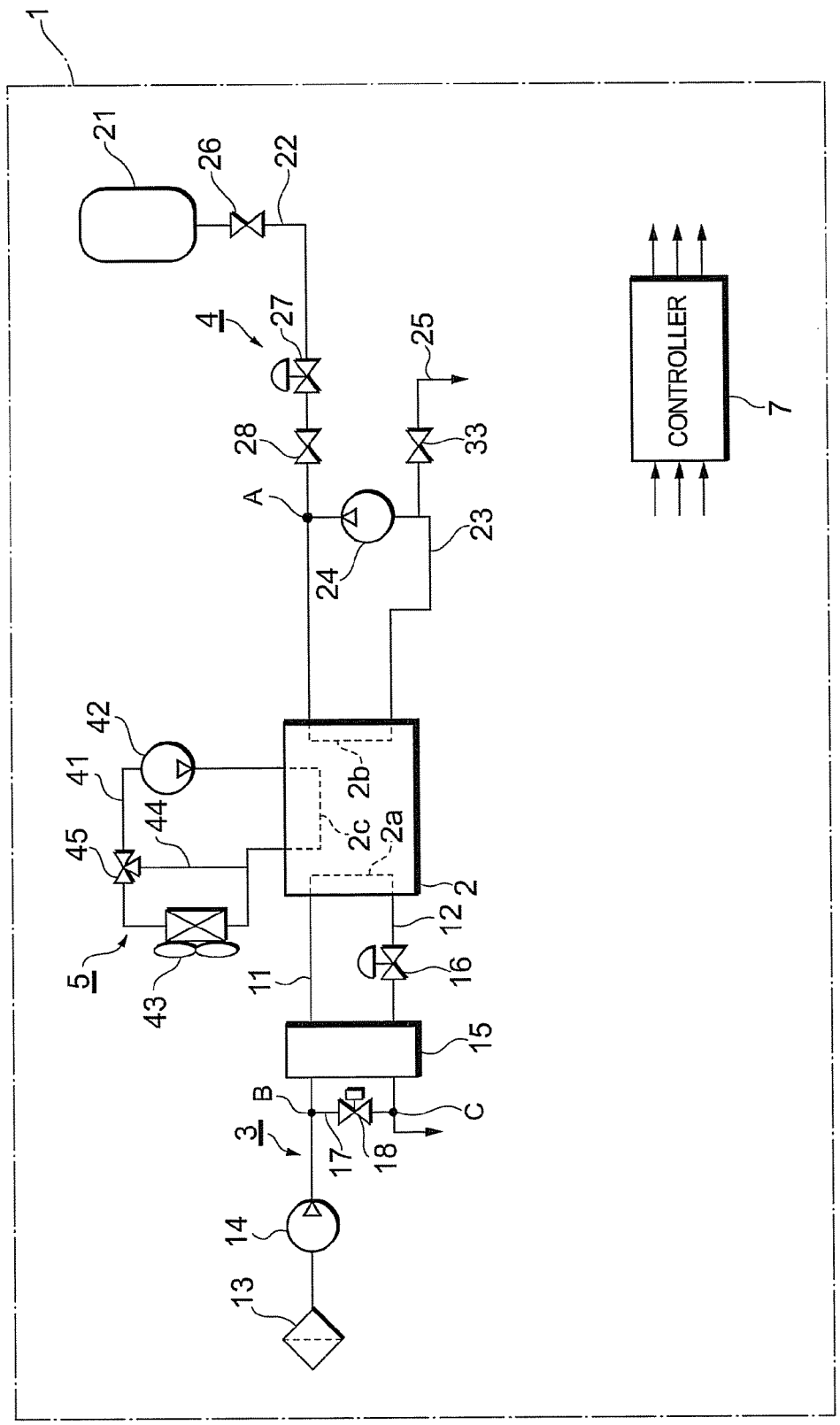
FIG. 1 is a constitution diagram of a fuel cell system according to a first embodiment of the present invention.

As shown in FIG. 1, a fuel cell system 1 includes a fuel cell 2, an oxidizing gas piping system 3, a fuel gas piping system 4, a refrigerant piping system 5, and a controller 7. The fuel cell system 1 can be mounted in a vehicle, but is, needless to say, applicable to not only the vehicle but also various mobile bodies (e.g., a ship, an airplane, a robot, etc.) and a stational power source.

The fuel cell 2 has a stack structure in which a large number of unit cells are stacked. Each unit cell of a solid polymer electrolyte type has an air electrode on one surface of an electrolyte, and a fuel electrode on the other surface thereof, and further has a pair of separators which sandwich the air electrode and the fuel electrode from both sides thereof. An oxidizing gas is fed to an oxidizing gas passage 2$a$ of one of the separators, and a fuel gas is fed to a fuel gas passage 2$b$ of the other separator. By an electrochemical reaction between the fed fuel gas and oxidizing gas, the fuel cell 2 generates a power. Moreover, by the electrochemical reaction, the fuel cell 2 generates heat and also forms water on the side of the air electrode. The temperature of the solid polymer electrolyte type fuel cell 2 is about 60 to 80° C.

The oxidizing gas piping system 3 has a supply path 11 and a discharge path 12. Through the supply path 11, the oxidizing gas to be fed to the oxidizing gas passage 2$a$ flows. Through the discharge path 12, the oxidizing off gas discharged from the oxidizing gas passage 2$a$ flows. The oxidizing off gas contains the water formed by the electrochemical reaction in the fuel cell 2 and hence has a highly humid state. A compressor 14 is provided in the supply path 11, and takes outside air as the oxidizing gas via an air cleaner 13 so as to feed the gas under pressure to the fuel cell 2. The oxidizing gas fed under pressure is appropriately humidified by water exchange performed between the oxidizing gas and the oxidizing off gas by a humidifier 15.

An air pressure regulation valve 16 is disposed around an air electrode outlet of the discharge path 12 to regulate a back pressure on the side of the air electrode. A bypass path 17 connects the supply path 11 to the discharge path 12 so that the oxidizing gas flows to bypass the fuel cell 2. The bypass path 17 is connected to the supply path 11 at a connection point B on the upstream side of the humidifier 15, and is connected to the discharge path 12 at a connection point C on the downstream side of the humidifier 15. The oxidizing off gas is finally discharged as an exhaust gas from the system to the outside air through a muffler (not shown). A bypass valve 18 provided in the bypass path 17 is opened, whereby a part of the oxidizing gas is branched to the bypass path 17 and guided to the muffler. The bypassed oxidizing gas dilutes so-called pumping hydrogen discharged to the discharge path 12 during a low-efficiency operation.

The fuel gas piping system 4 feeds and discharges a hydrogen gas as the fuel gas to and from the fuel cell 2. The fuel gas piping system 4 has a hydrogen supply source 21, a supply path 22, a circulation path 23, a pump 24, and a purging path 25. The hydrogen gas is discharged from the hydrogen supply source 21 to the supply path 22 by opening a source valve 26, and is fed to the fuel gas passage 2$b$ through a regulation valve 27 and a shut valve 28. Afterward, the hydrogen gas is discharged as a hydrogen off gas from the fuel gas passage 2$b$ to the circulation path 23. The hydrogen off gas is returned to a joining part A between the circulation path 23 and the supply path 22 by the pump 24, and is fed to the fuel gas passage 2$b$ again. A part of the hydrogen off gas is discharged from the circulation path 23 to the purging path 25 by appropriately opening a purging valve 33, and discharged externally from the system through a hydrogen diluter (not shown).

The refrigerant piping system 5 circulates a refrigerant (e.g., cooling water) through a cooling passage 2$c$ in the fuel cell 2, and holds the fuel cell 2 at a predetermined operation temperature. The cooling passage 2$c$ is connected to a refrigerant passage 41 through which the refrigerant circulates across the fuel cell 2 and a radiator 43. The refrigerant is fed under pressure to the cooling passage 2c by a cooling pump 42, discharged from the cooling passage 2c and then cooled by the radiator 43. A bypass passage 44 is connected to the refrigerant passage 41 so that the refrigerant flows to bypass the radiator 43. A switch valve 45 is a control valve which sets the circulation of the refrigerant across the radiator 43 and the bypass passage 44.

The controller 7 has a constitution of a microcomputer including therein a CPU, an ROM and an RAM, and generally controls the system 1. The CPU executes desired calculation according to a control program to perform various processing and control. The ROM stores a control program or control data to be processed by the CPU. The RAM is mainly used as various operation regions for control processing. The controller 7 inputs detection signals from various sensors such as a pressure sensor and a temperature sensor, and outputs control signals to constituent elements.

Figure 2:
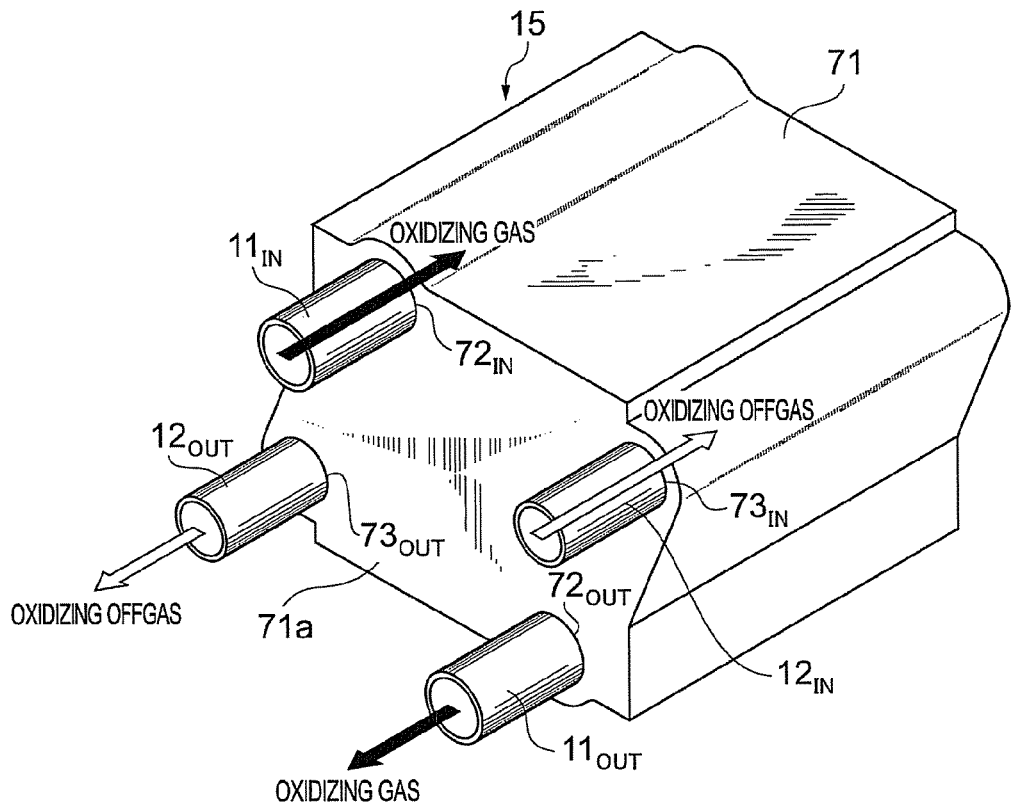
FIG. 2 is a perspective view showing the appearance of a humidifier of the present invention.
Figure 3:
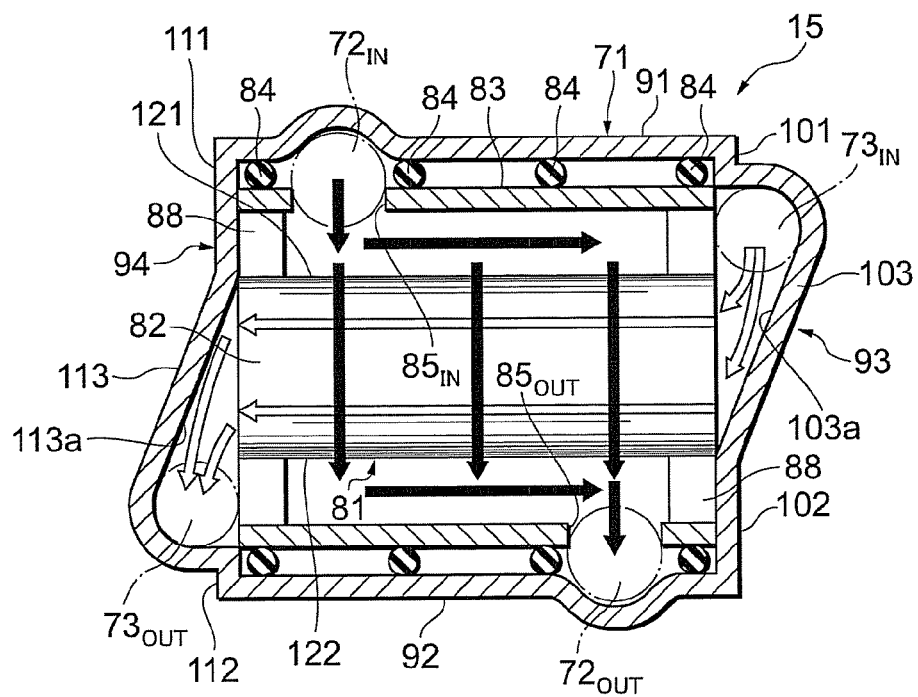
FIG. 3 is a sectional front view showing the inside of the humidifier of the present invention.

FIG. 2 is a perspective view showing the appearance of the humidifier 15, and FIG. 3 is a sectional front view showing the inside of the humidifier 15. The humidifier 15 employs an internal humidifying system, and humidifies the lowly humid oxidizing gas with the highly humid oxidizing off gas.

As shown in FIGS. 2 and 3, the humidifier 15 has a box-like case 71. A front surface 71a of the case 71 is provided with an inlet $72_{IN}$ and an outlet $72_{OUT}$ connected to an inlet pipe $11_{IN}$ and an outlet pipe $11_{OUT}$ for the oxidizing gas, respectively. Moreover, the front surface 71a is provided with an inlet $73_{IN}$ and an outlet $73_{OUT}$ connected to an inlet pipe $12_{IN}$ and an outlet pipe $12_{OUT}$ for the oxidizing off gas, respectively.

Through the inlets $72_{IN}$ and $73_{IN}$, the oxidizing gas and the oxidizing off gas are introduced into the case 71 from the outside thereof, respectively. Through the outlets $72_{OUT}$ and $73_{OUT}$, the oxidizing gas and the oxidizing off gas are discharged externally from the case 71. The inlets $72_{IN}$, $73_{IN}$ and the outlets $72_{OUT}$, $73_{OUT}$ are portions which connect the inside of the case 71 to the outside thereof and which may be referred to as connecting portions with respect to pipes outside the case 71, communicating portions or openings. It is to be noted that four portions shown by dotted circles in FIG. 3 correspond to the inlets $72_{IN}$, $73_{IN}$ and the outlets $72_{OUT}$, $73_{OUT}$, respectively.

The inlet pipe $11_{IN}$ and the outlet pipe $11_{OUT}$ are connected to each other through the case 71 to constitute the supply path 11. The inlet pipe $11_{IN}$ has one end thereof connected to the inlet $72_{IN}$ to introduce the oxidizing gas into the case 71. The outlet pipe $11_{OUT}$ has one end thereof connected to the outlet $72_{OUT}$, and the other end thereof connected to the fuel cell 2, whereby the oxidizing gas humidified by the humidifier 15 is discharged externally from the case 71, and fed to the fuel cell 2.

The inlet pipe $12_{IN}$ and the outlet pipe $12_{OUT}$ are connected to each other through the case 71 to constitute the discharge path 12. The inlet pipe $12_{IN}$ has one end thereof connected to the inlet $73_{IN}$, and the other end thereof connected to the fuel cell 2, to introduce the oxidizing off gas discharged from the fuel cell 2 into the case 71. The outlet pipe $12_{OUT}$ has one end thereof connected to the outlet $73_{OUT}$ to discharge the oxidizing off gas used for the humidification externally from the case 71.

As shown in FIG. 3, a bunch 81 of hollow fiber membranes (hereinafter referred to as "the hollow fiber membrane bunch 81") is provided in the case 71. In the hollow fiber membrane bunch 81, a large number of known hollow fiber membranes 82 each having an inner diameter of, for example, about several hundred μm are bunched. Each hollow fiber membrane 82 is a filter member having steam permeability, and may preferably have such characteristics that only steam permeates the membrane.

Figure 4:
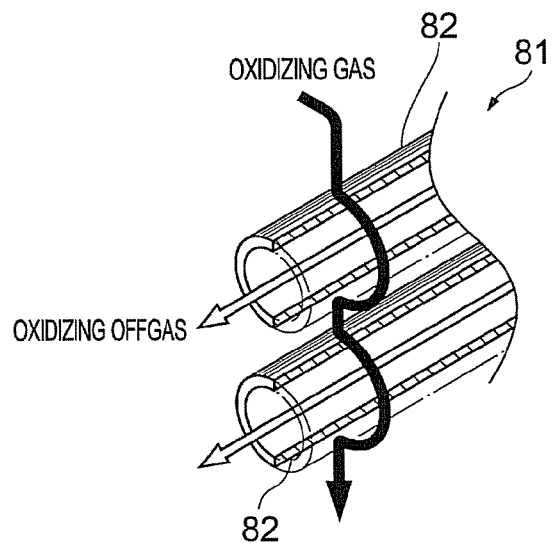
FIG. 4 is an enlarged sectional view of a hollow fiber membrane of the humidifier of the present invention.

As shown in FIG. 4, outside the hollow fiber membranes 82, the oxidizing gas flows, and inside the hollow fiber membranes (hollow portions), the oxidizing off gas flows. The water of the highly humid oxidizing off gas is absorbed by the hollow fiber membranes 82, and is drawn up to the outer peripheries of the membranes by a capillary phenomenon, to move to the lowly humid oxidizing gas passing by the outer peripheries of the hollow fiber membranes 82. In consequence, the oxidizing gas is humidified. It is to be noted that portions connected to the pipes may be changed, whereby outside the hollow fiber membranes 82, the oxidizing off gas flows, and inside the membranes, the oxidizing gas flows.

Returning to FIG. 3, the hollow fiber membrane bunch 81 is received in a housing 83 which surrounds the periphery of the bunch. The housing 83 has a cylindrical shape with both open ends in a longitudinal direction (the horizontal direction) thereof, and extends in the horizontal direction with a length substantially equal to that of the hollow fiber membrane bunch 81. The housing 83 is received in the case 71 while a space between the outer wall of the housing and the case 71 is sealed with a plurality of O-rings 84. The peripheral wall of the housing 83 is provided with a hole $85_{IN}$ for introducing the oxidizing gas and a hole $85_{OUT}$ for discharging the oxidizing gas. One or more holes $85_{IN}$ and one or more holes $85_{OUT}$ each having a peripheral direction are formed at positions corresponding to the inlet $72_{IN}$ and the outlet $72_{OUT}$ in the longitudinal direction, respectively.

Both ends of the hollow fiber membrane bunch 81 in an axial direction are provided with potting portions 88 for airtightly and liquid-tightly closing a gap between the hollow fiber membranes 82 and 82 and a gap between the hollow fiber membranes 82 and the housing 83. The potting portions 88 are formed by potting, for example, an adhesive therein, whereby the hollow fiber membrane bunch 81 is fixed to both the ends of the housing 83. The potting portions 88 prevent the oxidizing off gas flowing through the hollow portions of the hollow fiber membranes 82 from being brought into direct contact with the oxidizing gas flowing outside the hollow fiber membranes 82 in the housing 83, and water exchange between both the gases is performed via the hollow fiber membranes 82.

Here, a constitution which is effective for a countermeasure against freezing in the humidifier 15 will be described in detail.

The inlet $72_{IN}$ for the oxidizing gas is located at a position higher than that of the outlet $72_{OUT}$ therefor in a gravity direction, and the hollow fiber membrane bunch 81 is positioned between the inlet $72_{IN}$ and the outlet $72_{OUT}$. Similarly, the inlet $73_{IN}$ for the oxidizing off gas is located at a position higher than that of the outlet $73_{OUT}$ therefor in the gravity direction, and the hollow fiber membrane bunch 81 is positioned between the inlet $73_{IN}$ and the outlet $73_{OUT}$. It is to be noted that also when the humidifier 15 is mounted in a mobile body such as a vehicle, such a positionally relation in the gravity direction may be provided.

The oxidizing gas is introduced into the case 71 through the inlet $72_{IN}$, and then introduced into the housing 83 through the hole $85_{IN}$ to flow through the gap between the housing 83 and the hollow fiber membranes 82 and the gap between the hollow fiber membranes 82 and 82. The oxidizing gas humidified by the hollow fiber membranes 82 is discharged externally from the housing 83 through the hole $85_{OUT}$, and is finally discharged externally from the case 71 through the outlet $72_{OUT}$. In the series of flows, the oxidizing gas flows from the higher position to the lower position in the gravity direction across the inlet $72_{IN}$ and the outlet $72_{OUT}$.

On the other hand, the oxidizing off gas is introduced into the case 71 through the inlet $73_{IN}$, flows obliquely downwards outside the housing 83, and flows from one end of each hollow fiber membrane 82 into each membrane. Then, the oxidizing off gas horizontally flows from one end of each hollow fiber membrane 82 to the other end thereof (from the right end of FIG. 3 to the left end thereof), while the water in the oxidizing off gas is absorbed by the hollow fiber membranes 82. Afterward, the oxidizing off gas flows from the other end of each hollow fiber membrane 82, flows obliquely downwards outside the housing 83, and is then finally discharged externally from the case 71 through the outlet $73_{OUT}$. In the series of flows, the oxidizing off gas flows from the higher position to the lower position in the gravity direction across the inlet $73_{IN}$ and the outlet $73_{OUT}$.

The case 71 is configured so that the water included in the oxidizing off gas is not easily accumulated. Specifically, the box-like shape of the case 71 including a top wall 91, a bottom wall 92 and a pair of side walls 93, 94 is a nearly point-symmetric shape. The side wall 93 includes a vertical wall 101 continuing from the top wall 91 to the downside, a vertical wall 102 continuing from the bottom wall 92 to the upside, and a curved wall 103 extending between the vertical walls 101 and 102 to protrude outwards. The inlet $73_{IN}$ is positioned in an upper part inside the curved wall 103, and an inner wall 103a of the curved wall 103 positioned below the inlet $73_{IN}$ inwardly tilts downwards. The lower end of the inner wall 103a continues to the vertical wall 102 via none of horizontal portions.

According to such a constitution, even if water adheres to the inner wall 103a, the water falls down along the inner wall 103a, does not accumulate in the lower end of the inner wall, and moves from the hollow fiber membrane bunch 81 to the outlet $73_{OUT}$. It is to be noted that in the same manner as in the side wall 93, the side wall 94 includes a vertical wall 111 continuing from the top wall 91 to the downside, a vertical wall 112 continuing from the bottom wall 92 to the upside, and a curved wall 113 extending between the vertical walls 111 and 112 to protrude outwards. The outlet $73_{OUT}$ is positioned in a lower part inside the curved wall 113, and an inner wall 113a of the curved wall 113 positioned above the outlet $73_{OUT}$ outwardly tilts downwards.

According to the humidifier 15 described above, the inlet $72_{IN}$ of the oxidizing gas, the hollow fiber membrane bunch 81 and the outlet $72_{OUT}$ have a height level in this order. In consequence, even if moisture included in the oxidizing gas becomes water owing to condensation or the like, this water does not easily accumulate on the side of the inlet $72_{IN}$, and accumulates on the side of the outlet $72_{OUT}$. Similarly, the inlet $73_{IN}$ of the oxidizing off gas, the hollow fiber membrane bunch 81 and the outlet $73_{OUT}$ are located at the higher positions of the gravity direction in this order. In consequence, even if moisture included in the oxidizing off gas becomes water owing to condensation or the like, this water does not easily accumulate on the side of the inlet $73_{IN}$, and accumulates on the side of the outlet $73_{OUT}$.

Therefore, even when ice is formed in the case 71 at a low temperature (e.g., at 0° C.) After the stop of the operation of the fuel cell system 1, the ice forming portion is on the side of the outlets $72_{OUT}$ and $73_{OUT}$, which is the downstream side of the flows of the oxidizing gas and the oxidizing off gas. Therefore, during the next startup of the fuel cell system 1, the oxidizing gas and the oxidizing off gas introduced into the case 71 can inhibit the ice or condensed water from being flied toward the hollow fiber membrane bunch 81, so that the damaging of the hollow fiber membrane bunch 81 can be inhibited. Moreover, the condensed water accumulates on the side of the outlets $72_{OUT}$ and $73_{OUT}$, so that the freezing of the hollow fiber membrane bunch 81 can also be inhibited. Thus, according to the present embodiment, the freezing of the humidifier 15 can be inhibited, and hence the low-temperature startup properties of the fuel cell system 1 can be improved.

It is to be noted that the above embodiment is merely illustration for explaining the present invention, and the present invention is not limited to this embodiment, and can appropriately be changed without departing from the scope of the invention.

For example, the humidifier 15 may humidify the fuel gas to be supplied to the fuel cell 2. Moreover, when a dry gas (a first gas) to be humidified is the oxidizing gas or the fuel gas, a humid gas (a second gas) used for humidifying these gases is not limited to the oxidizing off gas or a fuel off gas, and may be a gas which is irrelevant to the operation of the fuel cell 2. Furthermore, as to gases caused to flow inside and outside the hollow fiber membranes 82, any gas may be caused to flow inside the hollow fiber membranes 82 as long as the gas is a combination of an inflow gas to the humidifier 15 and an outflow gas from the humidifier 15.

Moreover, all portions of the inlets $72_{IN}$ and $73_{IN}$ do not have to be higher than the hollow fiber membrane bunch 81, and similarly all portions of the outlets $72_{OUT}$ and $73_{OUT}$ do not have to be lower than the hollow fiber membrane bunch 81. Specifically, the portion of the inlet $72_{IN}$ located at the highest position of the inlet may be located higher than an upper limit position 121 of the hollow fiber membrane bunch 81, that is, the highest position of the bunch, and a part of the inlet $72_{IN}$ may be located lower than the upper limit position 121 of the hollow fiber membrane bunch 81. This respect also applies to the inlet $73_{IN}$. Moreover, the portion of the outlet $72_{OUT}$ located at the lowest position of the outlet may be located lower than a lower limit position 122 of the hollow fiber membrane bunch 81, that is, the lowest position of the bunch, and a part of the outlet $72_{OUT}$ may be located higher than the lower limit position 122 of the hollow fiber membrane bunch 81. This respect also applies to the outlet $73_{OUT}$. Also according to such a constitution, the freezing of the hollow fiber membrane bunch 81 can be inhibited.

Furthermore, the inlet $72_{IN}$ of the oxidizing gas is disposed in a position lower than the outlet $72_{OUT}$, and the inlet $73_{IN}$ of the oxidizing off gas is disposed in a position higher than the outlet $73_{OUT}$. Such a constitution may be employed in which the height levels of the outlet and the inlet of one of the oxidizing gas and the oxidizing off gas are reversed. Furthermore, the hollow fiber membrane 82 is used as a steam permeable membrane, but instead of this membrane, a flat membrane type may be used.

Second Embodiment

Next, with reference to FIGS. 5 to 8, a second embodiment of the present invention will be described mainly with respect to different respects. The embodiment is different from the first embodiment in that a positionally relation between each valve disposed around a humidifier 15 and the humidifier 15 is regulated.

Figure 5:
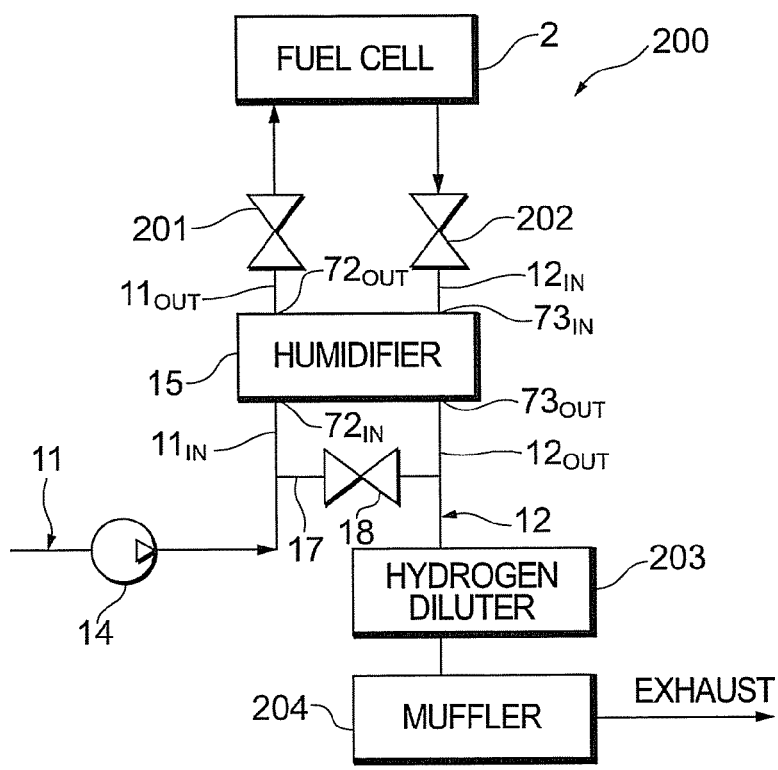
FIG. 5 is a constitution diagram showing a part of a fuel cell system according to a second embodiment.

As shown in FIG. 5, in a fuel cell system 200, the outlet pipe $11_{OUT}$ and the inlet pipe $12_{IN}$ are provided with shut valves 201, 202, respectively. Moreover, the bypass path 17 which connects the inlet pipe $11_{IN}$ to the outlet pipe $12_{OUT}$ is provided with the bypass valve 18 as described above. On the downstream side of the outlet pipe $12_{OUT}$, a hydrogen diluter 203 and a muffler 204 are provided. It is to be noted that the air cleaner 13 and the air regulation valve 16 in the fuel cell system 1 of the first embodiment are omitted from the drawing.

In the present embodiment, the shut valve 201, the shut valve 202 and the bypass valve 18 include valve bodies disposed in positions higher than the outlet $72_{OUT}$, the inlet $73_{IN}$ and the outlet $73_{OUT}$ in a gravity direction, respectively. Hereinafter, a height positionally relation between the valve body of the shut valve 201 and the outlet $72_{OUT}$ will be described as an example, but needless to say, this relation also applies to the shut valve 202 and the bypass valve 18. Moreover, in FIGS. 6 to 8, the constitution of the humidifier 15 is omitted.

Figure 6:
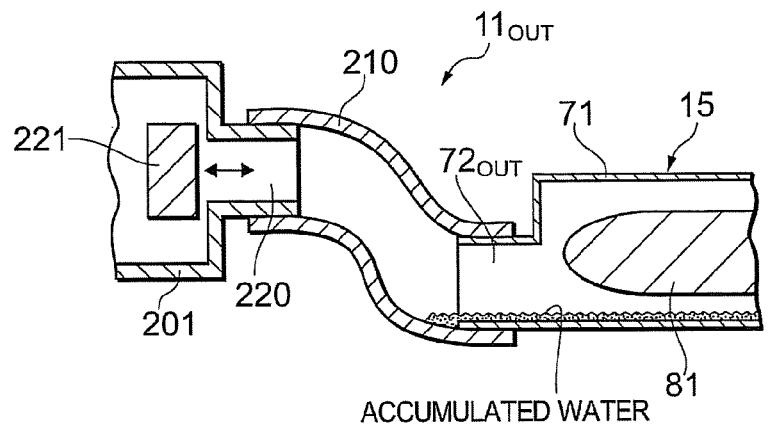
FIG. 6 is a schematic sectional view showing a first example of the layout of the humidifier and a valve of the present invention.

As shown in FIG. 6, one end of a hose 210 as a part of the outlet pipe $11_{OUT}$ is connected to the outlet $72_{OUT}$, and the other end thereof is connected to an outflow port 220 of the shut valve 201. The hose 210 bends upwards and extends across the outlet $72_{OUT}$ and the outflow port 220. The shut valve 201 comprises, for example, an electromagnetic valve, and a valve body 221 moves in a horizontal direction by an electromagnetic force to open or close the outflow port 220. The valve body 221 is positioned at the same height level as that of the outflow port 220, and is disposed in the position higher than the outlet $72_{OUT}$.

Therefore, even when the water accumulates on the side of the outlet $72_{OUT}$ (the above-mentioned lower part inside the curved wall 113), this water can be inhibited from reaching the valve body 221 through the hose 210. In consequence, even if the temperature of outside air is below the freezing temperature (e.g., 0° C.) of the water, the valve body 221 can be inhibited from being secured or causing any operation defect.

Figure 7:
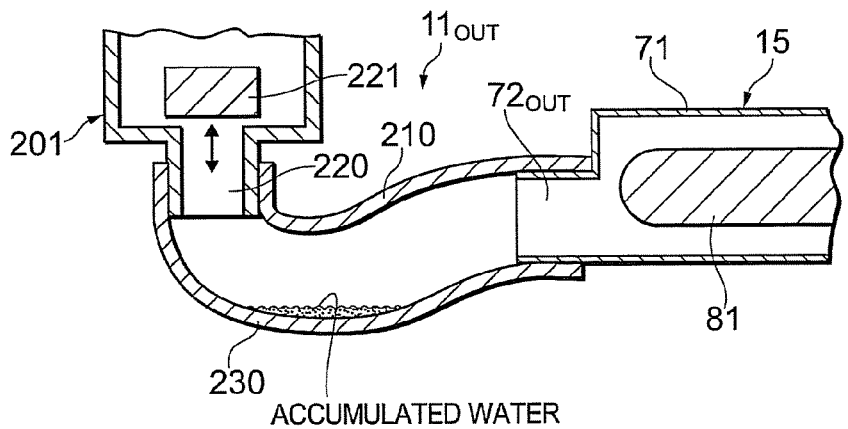
FIG. 7 is a schematic sectional view showing a second example of the layout of the humidifier and the valve of the present invention.
Figure 8:
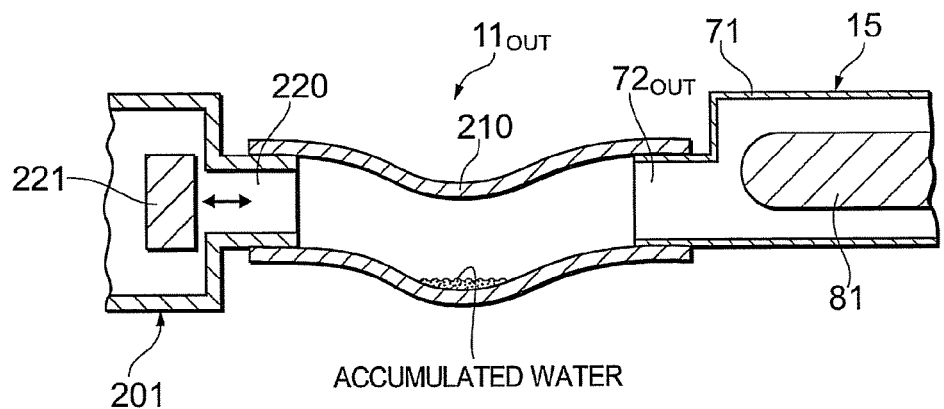
FIG. 8 is a schematic sectional view showing a third example of the layout of the humidifier and the valve of the present invention.

Instead of the layout shown in FIG. 6, a layout shown in FIG. 7 or 8 may be employed.

As shown in FIG. 7, the hose 210 between the outlet $72_{OUT}$ and the outflow port 220 may have a portion 230 positioned below them. Thus, the portion 230 disposed in the lowest position of the gravity direction is provided in the hose 210, whereby the water discharged from the outlet $72_{OUT}$ accumulates in the portion 230.

As shown in FIG. 8, when the valve body 221 is located at a position lower than or as high as the outlet $72_{OUT}$, in the same manner as in the layout shown in FIG. 7, a portion 240 positioned below the outlet $72_{OUT}$ and the outflow port 220 may be set in the hose 210. Also in this case, the water discharged from the outlet $72_{OUT}$ accumulates in the portion 240.

Therefore, even if the water accumulated in the portion 230 or 240 accumulates after the stop of the operation of the fuel cell system 200 or the like, this water is inhibited from reaching the valve body 221 through the hose 210. In consequence, according to the layout shown in FIG. 7 or 8, in the same manner as in the layout shown in FIG. 6, even if the temperature of the outside air is below the freezing temperature (e.g., 0° C.) of the water, the valve body 221 can be inhibited from being secured or causing any operation defect.

The invention claimed is:

1. A humidifier mounted in a mobile body which is provided therein with a steam permeable membrane and which introduces therein a first gas and a second gas having a humidity higher than that of the first gas to humidify the first gas by the second gas via the steam permeable membrane, the humidifier comprising:
   only one inlet and only one outlet for the first gas communicated with the inside of the humidifier;
   only one inlet and only one outlet for the second gas communicated with the inside of the humidifier, and
   a housing which surrounds the steam permeable membrane, and
   a case which is provided with the inlet and the outlet for the first gas and the inlet
   and the outlet for the second gas and in which the steam permeable membrane is disposed,
   wherein the inlet for the first gas is located at a position higher than the outlet for the first gas so that the first gas flows from a higher position to a lower position in a gravity direction,
   the inlet for the second gas is located at a position higher than the outlet for the second gas so that the second gas flows from a higher position to a lower position in a gravity direction,
   at least a part of the inlet for the first gas is higher than the upper limit position of the steam permeable membrane,
   a gap is provided between the housing and the steam permeable membrane, and
   at least a part of the outlet for the first gas is lower than the lower limit position of the steam permeable membrane,
   wherein the inlet for the first gas is located on an opposite side of the housing from that of the outlet for the first gas,
   wherein the inlet for the second gas is located on an opposite side of the housing from that of the outlet for the second gas, and
   wherein the case includes a pair of side walls,
   one side wall of the pair of side walls includes a curved wall,
   the inlet for the second gas is positioned in an upper part inside the curved wall, and an inner wall of the curved wall positioned below the inlet for the second gas inwardly tilted and downwards, the other side wall of the pair of side walls includes a curved wall,
   the outlet for the second gas is positioned in a lower part inside the curved wall, and an inner wall of the curved wall of the other side wall of the pair of side walls positioned above the outlet for the second gas and outwardly tilted downwards and wherein the inlet for the first gas, the outlet for the first gas, the inlet for the second gas and the outlet for the second gas have external pipe connections protruding from a third sidewall perpendicular to the said one and said other sidewalls of the case.

2. A humidifier mounted in a mobile body which is provided therein with a steam permeable membrane and which introduces therein a first gas and a second gas having a humidity higher than that of the first gas to humidify the first gas by the second gas via the steam permeable membrane, the humidifier comprising:
   only one inlet and only one outlet for the first gas communicated with the inside of the humidifier;
   only one inlet and only one outlet for the second gas communicated with the inside of the humidifier,
   a housing which surrounds the steam permeable membrane, and
   a case which is provided with the inlet and the outlet for the first gas and the inlet
   and the outlet for the second gas and in which the steam permeable membrane is disposed,
   wherein the inlet for the first gas is located at a position higher than the outlet for the first gas so that the first gas flows from a higher position to a lower position in a gravity direction,
   the inlet for the second gas is located at a position higher than the outlet for the second gas so that the second gas flows from a higher position to a lower position in a gravity direction, at least a part of the inlet for the second gas is higher than the upper limit position of the steam permeable membrane, and at least a part of the outlet for the second gas is lower than the lower limit position of the steam permeable membrane, wherein the inlet for the first gas is located on an opposite side of the housing from that of the outlet for the first gas, wherein the inlet for the second gas is located on an opposite side of the housing from that of the outlet for the second gas, wherein the steam permeable membrane is located in between the first gas inlet and the first gas outlet, as well as in between the second gas inlet and the second gas outlet, and wherein the case includes a pair of side walls, one side wall of the pair of side walls includes a curved wall, the inlet for the second gas is positioned in an upper part inside the curved wall, and an inner wall of the curved wall positioned below the inlet for the second gas inwardly tilted and downwards, and the other side wall of the pair of side walls includes a curved wall, the outlet for the second gas is positioned in a lower part inside the curved wall, and an inner wall of the curved wall of the other side wall of the pair of side walls positioned above the outlet for the second gas and outwardly tilted downwards and wherein the inlet for the first gas, the outlet for the first gas, the inlet for the second gas and the outlet for the second gas have external pipe connections protruding from a third sidewall perpendicular to the said one and said other sidewalls of the case.

3. The humidifier according to claim 1, wherein the steam permeable membrane is located at a position lower than the inlet for the first gas, but higher than the outlet for the first gas.

4. The humidifier according to claim 1, wherein the steam permeable membrane is located at a position lower than the inlet for the second gas, but higher than the outlet for the second gas.

5. The humidifier according to claim 1, wherein the steam permeable membrane is a hollow fiber membrane, the first gas flows outside the hollow fiber membrane, and the second gas flows through the hollow fiber membrane.

6. The humidifier according to claim 1, wherein the humidifier is connected to a pipe through which the first gas or the second gas flows to communicate with the inside of the humidifier, and the pipe is provided with a valve having a valve body located at a position higher than the humidifier in a gravity direction.

7. The humidifier according to claim 1, comprising a case which is provided with the inlet and the outlet for the first gas and the inlet and the outlet for the second gas and in which the steam permeable membrane is disposed.

8. A fuel cell system comprising:

a fuel cell which generates a power by an electrochemical reaction between an oxidizing gas and a fuel gas; and a humidifier which humidifies at least one of the oxidizing gas and the fuel gas to be fed to the fuel cell, wherein as the humidifier, the humidifier according to claim 1 is used.

9. The humidifier according to claim 2, wherein the steam permeable membrane is located at a position lower than the inlet for the first gas, but higher than the outlet for the first gas.

10. The humidifier according to claim 2, wherein the steam permeable membrane is located at a position lower than the inlet for the second gas, but higher than the outlet for the second gas.

11. The humidifier according to claim 2, wherein the steam permeable membrane is a hollow fiber membrane, the first gas flows outside the hollow fiber membrane, and the second gas flows through the hollow fiber membrane.

12. The humidifier according to claim 2, wherein the humidifier is connected to a pipe through which the first gas or the second gas flows to communicate with the inside of the humidifier, and the pipe is provided with a valve having a valve body located at a position higher than the humidifier in a gravity direction.

13. The humidifier according to claim 2, comprising a case which is provided with the inlet and the outlet for the first gas and the inlet and the outlet for the second gas and in which the steam permeable membrane is disposed.

14. A fuel cell system comprising:

a fuel cell which generates a power by an electrochemical reaction between an oxidizing gas and a fuel gas; and a humidifier which humidifies at least one of the oxidizing gas and the fuel gas to be fed to the fuel cell, wherein as the humidifier, the humidifier according to claim 2 is used.

* * * * *